US008673064B2

(12) United States Patent
Ahmed et al.

(10) Patent No.: US 8,673,064 B2
(45) Date of Patent: Mar. 18, 2014

(54) PARTIAL WALL-FLOW FILTER AND METHOD

(75) Inventors: Izhar Zahoor Ahmed, Painted Post, NY (US); Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 282 days.

(21) Appl. No.: 12/994,565

(22) PCT Filed: May 15, 2009

(86) PCT No.: PCT/US2009/003062
§ 371 (c)(1),
(2), (4) Date: Nov. 24, 2010

(87) PCT Pub. No.: WO2009/148498
PCT Pub. Date: Dec. 10, 2009

(65) Prior Publication Data
US 2011/0132194 A1    Jun. 9, 2011

Related U.S. Application Data

(60) Provisional application No. 61/057,079, filed on May 29, 2008.

(51) Int. Cl.
*B01D 46/00* (2006.01)
*B01D 50/00* (2006.01)
*B01D 39/14* (2006.01)
*B01D 39/06* (2006.01)
*B01D 24/00* (2006.01)

(52) U.S. Cl.
USPC ............... 95/273; 55/522; 55/523; 55/524; 422/169; 422/170; 422/171; 422/172; 422/177; 422/178; 422/179; 422/181; 422/180; 422/182

(58) Field of Classification Search
USPC ............... 55/522–524; 95/279, 273; 422/169–172, 177–182
See application file for complete search history.

(56) References Cited

U.S. PATENT DOCUMENTS 4,329,162 A * 5/1982 Pitcher, Jr. ............ 55/523
4,417,908 A * 11/1983 Pitcher, Jr. ............ 55/523
(Continued)

FOREIGN PATENT DOCUMENTS

EP    1 353 046    10/2003
WO    2005/106218    11/2005
(Continued)

*Primary Examiner* — Amber Orlando
(74) *Attorney, Agent, or Firm* — Matthew B. McNutt; Joseph M. Homa (57) ABSTRACT

A partial wall-flow filter having some unplugged flow-through channels and some plugged channels. Desirable combinations of filtration efficiency and back pressure may be provided by combinations of t wall≤305 urn, MPD≤20 μm, % P≥50%, and CD≥250 cpsi wherein t wall is the transverse thickness of the porous walls, MPD is a mean pore diameter of the porous walls, % P is the total porosity of the porous walls, and CD is the cell density of the channels. In one embodiment, some of the plugged channels are located adjacent to the inlet end and some are located adjacent to the outlet end. Systems and method including the partial wall-flow filter are also described.

17 Claims, 8 Drawing Sheets

(56) References Cited

U.S. PATENT DOCUMENTS

| | | | |
|---|---|---|---|
| 7,052,532 B1* | 5/2006 | Liu et al. | 96/154 |
| 7,141,087 B2 | 11/2006 | Noguchi et al. | 55/523 |
| 7,919,168 B2* | 4/2011 | Mizutani | 428/117 |
| 8,143,190 B2* | 3/2012 | Furuta et al. | 502/439 |
| 2002/0090324 A1* | 7/2002 | Badeau et al. | 422/171 |
| 2003/0097834 A1* | 5/2003 | Gabe et al. | 60/297 |
| 2004/0161373 A1 | 8/2004 | Ichikawa et al. | 422/180 |
| 2005/0076627 A1* | 4/2005 | Itou et al. | 55/523 |
| 2005/0129907 A1* | 6/2005 | Yamaguchi | 428/116 |
| 2006/0120937 A1 | 6/2006 | Zuberi | 423/215.5 |
| 2006/0185335 A1* | 8/2006 | Ichikawa | 55/523 |
| 2006/0188415 A1* | 8/2006 | Ohno et al. | 422/177 |
| 2006/0280905 A1 | 12/2006 | Ichikawa | 428/116 |
| 2007/0048494 A1* | 3/2007 | Miyairi et al. | 428/116 |
| 2008/0032090 A1 | 2/2008 | Beall et al. | 428/116 |
| 2008/0034739 A1 | 2/2008 | Ranalli | 60/295 |
| 2008/0120968 A1 | 5/2008 | Beall et al. | 60/295 |

FOREIGN PATENT DOCUMENTS

| | | |
|---|---|---|
| WO | 2006/029808 | 3/2006 |
| WO | 2006/115629 | 11/2006 |
| WO | 2007/079377 | 7/2007 |
| WO | 2009/029200 | 3/2009 |

* cited by examiner

PARTIAL WALL-FLOW FILTER AND METHOD

CROSS-REFERENCE TO RELATED APPLICATIONS

This application claims the benefit of priority to U.S. provisional application No. 61/057,079, filed on May 29, 2008.

FIELD

The present disclosure relates generally to wall-flow filters used to filter exhaust gases, and more particularly to wall-flow filters having some plugged and some unplugged channels.

BACKGROUND

Diesel exhaust systems may include, for example, a diesel particulate filter (DPFs) for removing particulates, such as soot from diesel exhaust. The most widely used DPFs are wall-flow filters. A conventional wall-flow filter includes a ceramic honeycomb body having longitudinal, generally parallel cell channels formed by a plurality of intersecting porous walls. The cell channels are typically plugged with a ceramic plugging cement to form a checkered pattern of plugs at the end faces of the honeycomb body. The cell channels of the filter typically have some ends unplugged at an inlet end face of the honeycomb body, referred to herein as "inlet channels." Likewise, typically, the cell channels also have the remaining ends plugged to form a checkered pattern of plugs at an outlet end face of the honeycomb substrate with some ends unplugged, herein referred to as "outlet channels." In use, exhaust gas containing entrained soot particles enters into the (unplugged) inlet channels, flows through the porous walls (i.e., the wall-flow) and into the outlet channels, and exits through the (unplugged) outlet channels, wherein the porous walls retain a portion of the particles that were entrained in the exhaust. In conventional wall flow filter designs, every channel is plugged at alternate ends. In this conventional design, exhaust gas enters open channels on the inlet end. The inlet channels are plugged at the outlet end, and so the gas is forced to travel through the porous wall into an adjacent channel which is open at the outlet end but plugged at the inlet end to exit the filter. Filtration of the particulate matter is accomplished as the gas is forced to pass through the porous wall. Filtration efficiencies greater than 90% have been realized with conventional wall-flow filters.

Conventional wall-flow filters may be cleaned out to prevent the filter from becoming blocked and to maintain a suitable pressure drop across the filter below a prescribed limit. Increase in pressure drop across the filter generally results in an increase in backpressure against the engine which, if not controlled, may lead to power loss. One known method for cleaning out the filter is to remove the soot trapped in the filter by thermal regeneration (hereinafter "regeneration"). The regeneration may be either "passive" or "active" or a combination thereof. In "passive" regeneration, the inlet temperature of the exhaust entering the filter is sufficiently high to itself initiate combustion of the soot trapped in the wall-flow filter on a generally continuous basis, once steady state conditions are met. In "active" regeneration, the location of the filter is such that the temperature of the filter is relatively low and additional energy input may be required to raise the temperature of the exhaust (and the filter) to a level that would cause combustion of the soot trapped in the filter. Typically, the additional energy input is provided by post injection of fuel into the exhaust in combination with a diesel oxidation catalyst located upstream of the filter.

Diesel exhaust systems based on "active" regeneration have become the industry standard because they desirably operate at lower exhaust temperatures and assure suitable soot removal under different engine duty cycles by implementing regeneration. On the other hand, "active" regeneration comes with a fuel economy penalty. Further, conventional filters may exhibit relatively high back pressure. Accordingly, systems and filters which operate with fewer regeneration events during operation are desired, as are filters exhibiting lower backpressures.

SUMMARY

In one broad aspect, a partial wall-flow filter is disclosed herein comprising some plugged channels and some unplugged flow-through channels. The partial wall-flow filter comprises a plurality of porous walls forming channels wherein some of the channels are plugged channels and some are unplugged flow-through channels and the porous wall further comprises t wall≤305 MPD≤20 μm, % P≥50%, and CD≥250 cpsi wherein t wall is the transverse thickness of the porous walls, MPD is a mean pore diameter of the porous walls, % P is the total porosity of the porous walls, and CD is the cell density of the channels.

In certain wall-flow filter embodiments, the filter comprises some unplugged channels and some plugged channels wherein the plugged channels include some channels that are plugged adjacent to an inlet end and other channels that are plugged adjacent to an outlet end of the partial wall-flow filter.

According to another aspect, a method of operating an exhaust system is provided, comprising providing a partial wall-flow filter having a plurality of porous walls forming channels wherein some of the channels are plugged channels and some are unplugged flow-through channels in an exhaust line wherein the porous walls further comprise t wall≤305 μm, MPD≤20 μm, % P≥50%, and CD≥250 cpsi wherein t wall is the transverse thickness of the porous walls, MPD is a mean pore diameter of the porous walls, % P is the total porosity of the porous walls, and CD is the cell density of the channels.

Other features and advantages will be apparent from the following description and the appended claims.

BRIEF DESCRIPTION OF THE DRAWINGS

The accompanying drawings, described below, illustrate exemplary embodiments and are not to be considered limiting of the scope of the invention. The figures are not necessarily to scale, and certain features and certain view of the figures may be shown exaggerated in scale or in schematic in the interest of clarity and conciseness.

DETAILED DESCRIPTION

A few example embodiments are illustrated in the accompanying drawings. In describing the example embodiments, numerous specific details are set forth in order to provide a thorough understanding of the embodiments. However, it will be apparent to one skilled in the art that some or all of these specific details are not required. In other instances, well-known features and/or process steps have not been described in detail so as not to unnecessarily obscure the embodiments. In addition, like or identical reference numerals are used to identify common or similar elements.

Figure 1A:
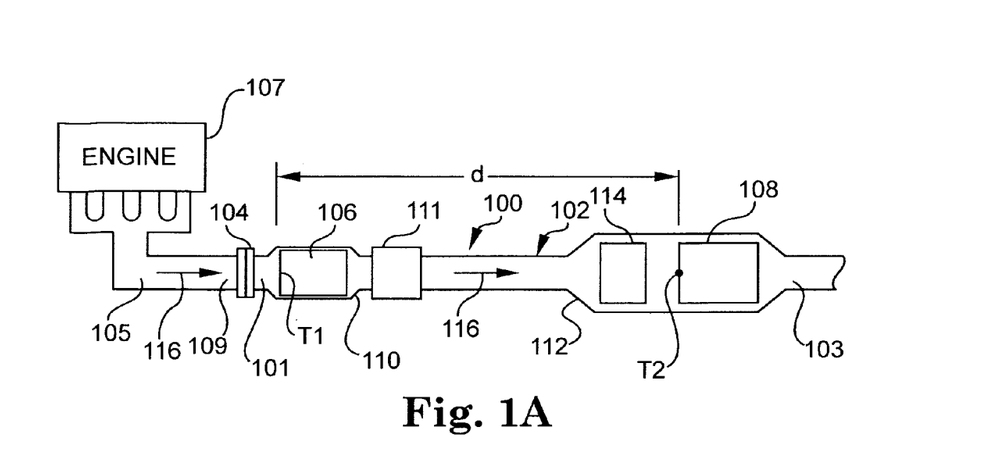
FIGS. 1A and 1B are schematic diagrams of diesel exhaust systems according to exemplary embodiments.

FIG. 1A depicts an exhaust system 100, such as a diesel exhaust system, for venting exhaust from an exhaust manifold 105 of a diesel engine 107. The exhaust system 100, as shown, includes an exhaust line 102 with inlet end 101 and outlet end 103. The inlet end 101 is coupled to the diesel engine 107 through an exhaust manifold 105. The inlet end 101 may include a connection device 104, which may take on any suitable form. For example, the connection device 104 may be a flange that can be coupled to a similar flange on a connection portion 109 of the exhaust manifold 105. Although the exhaust line 102 is shown as being generally straight, in practice it may take on other profiles and may include straight and curved sections and/or sections of differing diameter.

Figure 1B:
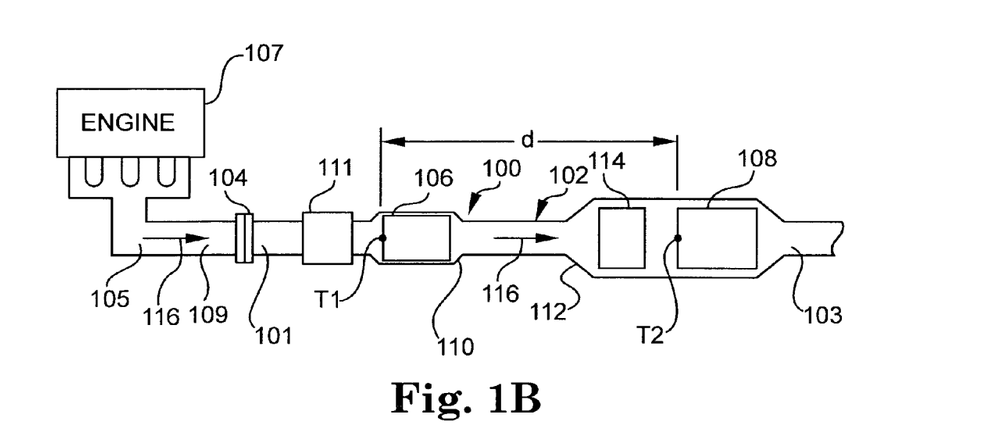

The exhaust system 100 includes a first particulate filter 106 disposed adjacent to the inlet end 101 of the exhaust line 102 such as partial wall-flow filter described herein. The first filter may be in a "close-coupled" position with respect to the engine 107 and, of course, also the exhaust manifold 105. In this "close-coupled" position, the first particulate filter 106 may take advantage of the higher incident exhaust temperatures to effect a substantially greater extent of "passive" regeneration of the captured soot, as compared to a downstream (second) filter. The term "close-coupled" as used herein, means the filter is in a location in the exhaust stream in close proximity to the engine 107, and, in particular, in close proximity to the combustion chambers of the engine, as measured along the exhaust stream. For example, "close-coupled" would be considered in close proximity of the engine 107, measured along the exhaust line, such that the temperature for at least some portion of the operating cycle exceeds 250° C. Preferably, for at least 50% of the operation, the inlet temperature ($T_1$) of the first filter exceeds 200° C. In one example shown in FIG. 1A, a turbocharger 111 is positioned in the exhaust line 102 and the first particulate filter 106 is positioned upstream of the turbocharger 111 such that the hot gases directly impinge upon the first filter 106. In another embodiment, the first filter 106 is located directly downstream of the turbocharger 111 (See FIG. 1B). In the close-coupled position, the first filter 106 may experience temperature conditions of 250° C. or greater for a substantial amount, greater than 10%, or even greater than 20%, of the operating cycle. These conditions promote a substantial amount of "passive" regeneration. In some embodiments, to avoid unwanted damage to the filter, the inlet temperature $T_1$ should preferably not exceed about 400° C.

The exhaust system 100 may further include a second particulate filter 108 positioned in the exhaust line 102, and spaced a distance (d) from the first particulate filter 106. In the examples shown in FIG. 1A, 1B, the second particulate filter 106 may be positioned downstream of a turbocharger 111. Additional particulate filters may be positioned in the exhaust line 102, downstream of the second particulate filter 106 to meet desired filtration and backpressure requirements. The second particulate filter 106 may be preceded by an upstream diesel oxidation catalyst (DOC) 114, which may incorporate any known active catalytic species for purifying exhaust, such as catalytic species for oxidizing carbon monoxide, hydrocarbons, and soluble organic fraction of particulates, as is known in the art. If included, the DOC 114 may be located between the first 106 and second 108 filters. The exhaust system 100 may further include devices such as diffusion and expansion cones 110, 112 at the inlet and outlet ends of the particulate filters 106, 108 to aid in achieving desired exhaust flow distribution in the particulate filters, and/or size and weight reductions in the exhaust line 102.

During normal operation of the engine, such as during the operation of a diesel engine, exhaust from the engine 107 and exhaust manifold 105 passes sequentially through the first particulate filter 106, turbocharger 111 (if present), oxidation catalyst 114 (if present), and second particulate filter 108, as indicated by arrow 116 in FIG. 1A. Particulates in the exhaust are trapped inside the first and second particulate filters 106, 108 as the exhaust passes through them. In particular, part of the soot is trapped in the first filter, while some of the remaining soot is trapped in the second filter. The engine operating conditions and location of the first filter 106 relative to the engine 107 may be set such that the inlet temperature $T_1$ of the exhaust at the first filter 106 is sufficient to itself initiate combustion of soot trapped in the first filter 106, i.e., to promote "passive" regeneration. Contrarily, the second filter 108 is spaced a distance (d) from the first filter 106 such that its inlet temperature $T_2$ is low in comparison to the inlet temperature $T_1$ of the first filter 106. In particular, the distance (d) is spaced generally such that a ratio of inlet temperatures (T1/T2) is greater than or equal to 1.1, or even greater than or equal to 1.15. Preferably, the spacing of the filters is such that the temperature difference, $T_1 - T_2$, is 20° C. or more, or even the difference is 25° C. or more.

According to some embodiments, the first particulate filter 106 may be a partial wall-flow filter. A partial wall-flow filter as defined herein is a particulate filter having porous walls forming channels wherein some of the channels are plugged and some of the changed are completely unplugged flow-through channels. Such a partial wall-flow filter generally has a relatively low pressure drop in comparison to conventional filters wherein in the conventional case all the channels are plugged (e.g. at one end or the other end).

In one example, the first particulate filter 106 may be small enough to fit into the available space near the exhaust manifold 105, between the exhaust manifold 105 and the turbocharger 111, or just downstream of the turbocharger. The physical space (volume) needed to house the first particulate filter 106 may be relatively smaller than the space (volume) to house the second filter 108, because the second particulate filter 108 provides the additional volume needed to meet filtration requirements. In one implementation, the second particulate filter 108 may be a conventional wall-flow filter, for example. However, a conventional wall-flow filter would typically not be suitable for use as the first particulate filter 106 because of the size and pressure drop requirements for a filter in a "close-coupled" position. In particular, it is desirable that the first filter exhibit low pressure drop. Because of the low pressure drop requirement, the first particulate filter 106 may provide a lower filtration efficiency as compared to the second particulate filter 108. As an example, the first particulate filter 106 may have an initial filtration efficiency (FE @ 0 g/L) of less than about 80%. However, according to some embodiments, initial filtration efficiencies FE@ 0 g/L≥20% are achievable, or FE@ 0 g/L≥30%, FE@ 0 g/L≥40%, or even FE@ 0 g/L≤50%.

Further embodiments include a partial wall-flow filter having excellent properties for use in exhaust systems such as described above. It should be recognized that the partial wall-flow filter can be utilized in an exhaust system as the only exhaust treatment component in the system. For example, the system may include only a partial wall-flow filter, either being catalyzed or uncatalyzed. Optionally, the partial wall-flow filter may be used in combination with other conventional exhaust treatment components, and the partial wall flow filter is the only filter in the system. For example, diesel oxidation catalyst (DOC) or NOx treatment components may be employed in combination with the partial wall-flow filter. The partial wall-flow filter may be, for example, preceded by an upstream DOC component. As discussed, a catalyst may be applied to the walls of the partial wall-flow filter, such as for treating carbon monoxide, hydrocarbons, and/or nitrogen oxides, such as a diesel oxidation catalyst or NOx catalyst. Suitable noble metals may be carried on the walls, such as platinum, rhodium, and palladium. Non-noble metals such as copper, titania, vanadium, zeolite, and perovskite catalyst may also be carried.

Now describing a partial wall-flow filter 200 in more detail, a first embodiment is shown and described with reference to FIGS. 2A and 2B. The partial wall-flow filter 200 is so named because it exhibits a combination of plugged channels and unplugged flow-through channels. In the unplugged flow-through channels, flow is generally straight through the channel, i.e., not through the wall. In the plugged channels some of the flow passes through the walls. Thus, the "partial" indicates that only a part of the flow is through the wall whereas part of the flow passes through the filter without flowing through a wall. According to certain embodiments, the partial wall-flow filter 200 comprises a porous honeycomb body 202 having a plurality of porous walls 208 forming channels 210a, 210b, and 210c wherein some of the channels are plugged channels and the remainder are unplugged flow-through channels 210a. In this embodiment, the plugged channels (210b, 210c) include some channels that are plugged adjacent to an inlet end 210b of the filter 200, that is, at or near the inlet end. The other channels 210c are plugged adjacent to an outlet end of the filter 300, that is, at or near the outlet end. Plugs 212 may be provided at, for example, an end face of some of the channels 210, while the remaining channels 210 remain open (unplugged). This differs from the conventional wall-flow filter where all the cell channels are end-plugged (at one end or the other). In some embodiments, the unplugged, flow-through channels 210a, which are open at both ends 204, 206 and are unplugged along their length, are evenly distributed among the plugged channels 210b, or vice versa. Optionally, the plugs may be provided at locations spaced in from the ends.

In some embodiments, relatively more plugs are provided adjacent the outlet end 206 than near the inlet end. Embodiments including this configuration and high porosity, greater than 45%, exhibit relatively minimal pressure drop as a function of soot loading. For example, FIG. 8 illustrates that partial flow filter configurations with 25% of the plugs located adjacent to the inlet end and 25% of the plugs located adjacent to the outlet end and porosity greater than 60% exhibit a pressure drop of less than 0.5 kPa from 0 to 2 g/l soot loading. Partial flow filters with high porosity, greater than 60%, with about 50% rear plugs (at or near the outlet end) also exhibit low pressure drop change as a function of soot loading. In some embodiments, a larger percentage of plugs are provided adjacent to the inlet end as compared to that at the outlet end.

Figure 2A:
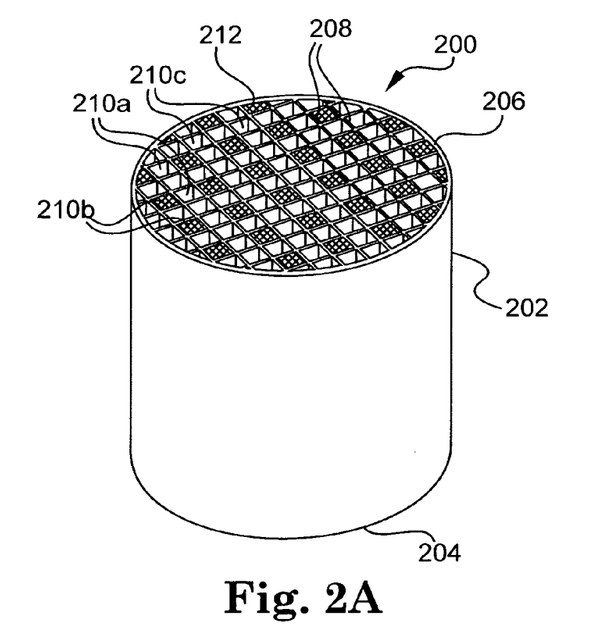
FIGS. 2A and 2B are perspective views of a partial wall-flow filter for use in the exhaust systems of FIGS. 1A, 1B.
Figure 2B:
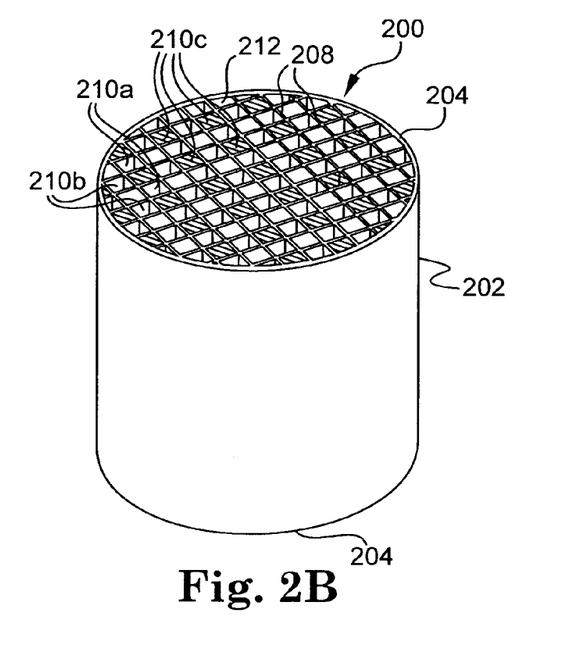

An embodiment of a partial flow filter is demonstrated in FIGS. 2A and 2B, where unplugged, flow-through channels are designated 210a, plugged channels having plugs located at the end 204 are designated 210c, and plugged channels having plugs at the end 206 are designated 210b.

Figure 3:
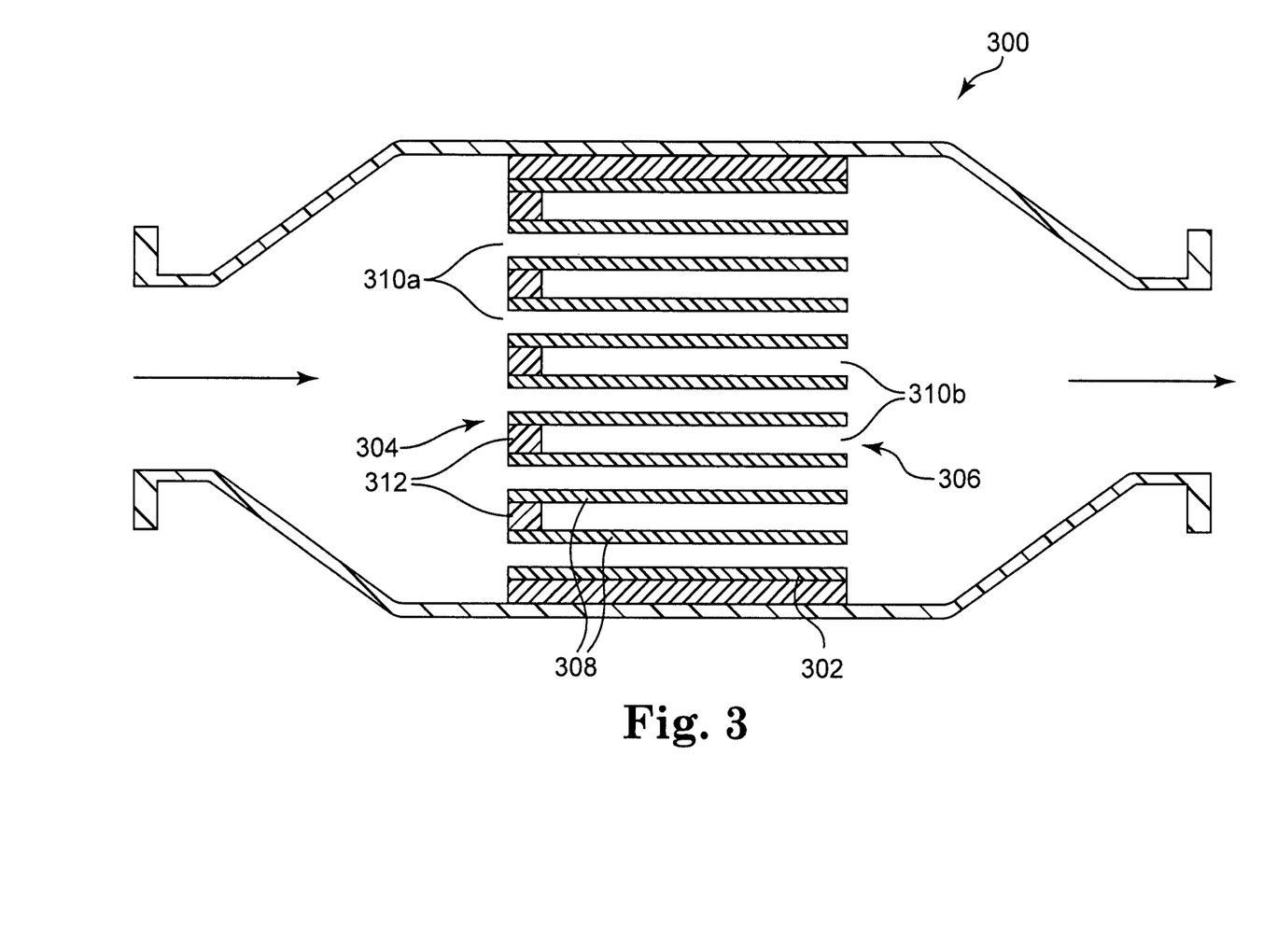
FIG. 3 is another example of a partial wall-flow filter according to exemplary embodiments.

A second embodiment of a partial wall-flow filter 300 is shown and described with reference to FIG. 3. In this embodiment, the filter 300 includes a porous honeycomb body 302 having a plurality of porous walls 308 intersecting to define and form a plurality of channels. The channels include some which are unplugged (unplugged channels 310a) and some which are plugged (plugged channels 310b). In this embodiment, the plugs 312 are all included on the inlet end 304 of the filter 300. In this embodiment, approximately 50% of the channels are plugged and the remainder comprise flow-through channels.

According to further embodiments of the partial wall-flow filter, it has been discovered that combinations of good initial filtration efficiency (@ 0 g/L) and relatively low back pressure may be achieved. According to embodiments, the following features in partial wall-flow filter 200, 300, when provided either singly, or in combination, have been found by the inventors to yield desirable filter properties. For example, it is possible to achieve higher deep bed filtration efficiency even when the total porosity (% P) is % P≥50%, or even % P≥60%. Thus, simultaneously relatively low back pressure and good deep bed filtration efficiency may be obtained. Increases in wall thickness (T wall) have been found by the inventors to influence pressure drop significantly with only marginal effect on filtration efficiency. Thus, the transverse thickness, T wall, of the porous walls 208, 308, may be T wall≤305 μm, T wall≤254 μm, or even T wall≤203 μm, while only marginally affecting back pressure. Also, increasing the mean pore diameter (MPD) increases deep bed mode filtration efficiency while only slightly decreasing back pressure. Thus, the porous walls 208, 308 may incorporate pores having a mean pore diameter (MPD) wherein MPD≤20 μm, or even MPD≤15 μm; in some embodiments 12 μm≤MPD≤30 μm. Additionally, deep bed filtration efficiency increases significantly with higher cell density (CD) with only a modest increase in back pressure. Accordingly, the partial flow filter (such as 200, 300) have a cell density (CD) wherein CD≥250 cpsi (CD≥37.5 cells/cm$^2$), or even CD≥300 cpsi (CD≥45 cells/cm$^2$).

The partial wall-flow filter 200, 300 include a porous honeycomb body 202, 302 having, for example, a generally cylindrical shape. The transverse cross-section of the honeycomb body 202 may be circular, oval, elliptical, square, or may have other desirable shape. The honeycomb body 202, 302 has inlet ends 204, 304 outlet ends 206, 306 and interior porous walls 208, 308 extending between the ends. The channels may have a square cross-section or other type of cross-section, e.g., triangle, circle, octagon, rectangle, hexagon or combinations thereof. The honeycomb substrate 202, 302 is preferably made of a porous ceramic material, such as cordierite, aluminum titanate, or silicate carbide or other like ceramic material particularly whose open interconnected porosity may be controlled.

In a partial wall-flow filter 300 with plugs on only one side, partial filtration occurs by passage of exhaust through some of the walls, while some flow passes straight through the filter (i.e., not through a wall). When plugs are positioned adjacent to the inlet end 304 of the filter 300, exhaust enters the unplugged, flow-through channels 310a and a pressure differential between the unplugged, flow-through channels and adjacent plugged channels 310b forces some exhaust through the wall to exit through the outlet side 306 of the plugged channels. Soot accumulation in this case occurs on the walls of the unplugged, flow-through channels. When the plugs 312 are positioned adjacent to the outlet end 306 of the filter (reversing the orientation of the filter in FIG. 3), a pressure differential between plugged and unplugged flow-through channels results in transfer of exhaust from plugged channels to unplugged, flow-through channels, and soot may be accumulated in the plugged channels.

Filters with combinations of plugged channels and unplugged, flow-through channels where % P≥50%, and even % P≥60% have been found to be particularly effective as a first filter promoting high soot capture in the first filter and exhibiting low pressure drop.

In the partial wall-flow filters described herein, soot accumulates on the porous walls as exhaust passes through the filter. This accumulation of soot decreases the permeability of the walls and reduces exhaust flow to channels adjacent to the unplugged, flow-through channels 210a. Thus, the ability of the partial wall-flow filter to capture soot decreases as soot is accumulated in the filter. One advantage of a filter which decreases in filtration efficiency is that a maximum soot load can be established for the filter and overloading of soot in the filter is less likely to occur in a partial wall-flow filter. In conventional wall-flow filters, filtration efficiency generally increases as soot load accumulation on the porous walls increases, making the filter more susceptible to soot overload. Soot overload is undesirable because maximum temperatures encountered in the filter during regeneration are generally directly proportional to soot load. The partial wall-flow filter of the embodiments has a built-in protection against high temperature excursions resulting from soot overload.

Various examples of partial plugging patterns will now be described for the partial wall-flow filter. However, these examples should not be construed as limiting the embodiments as otherwise described herein.

In one set of embodiments, the partial wall-flow filter comprises a honeycomb body plugged at a first end in a checkerboard pattern (alternately plugged and unplugged channels) and the body is plugged at the opposite second end in a non-checkerboard pattern wherein some of the channels that are unplugged at the first end are also unplugged at the second end; for example 50% of the channels are plugged at the first end, and fewer than 50% of the channels are plugged at the second end.

Figure 3A:
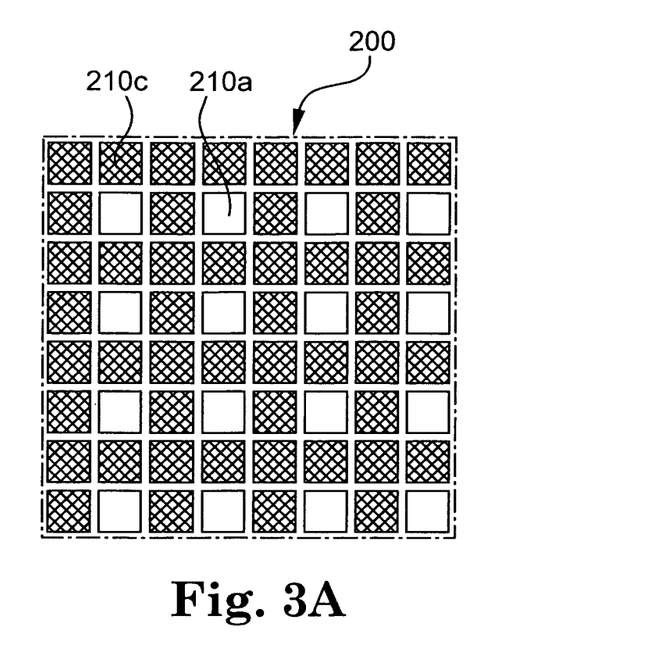
FIGS. 3A-3D are examples of plugging patterns which may be employed for the partial wall-flow filter according to exemplary embodiments.

FIG. 3A shows a partial plugging pattern of the inlet end of the filter 200 wherein the number of plugged channels 210c is greater than the number of unplugged, flow-through channels 210a. For a respective end, the unplugged, flow-through channels 210a may be evenly distributed among the plugged channels 210c. In some embodiments, the ratio of the total number of plugged channels to total number of channels for the filter, expressed as a percentage, can constitute greater than 50%, greater than 60%, greater than or equal to 75%, or even greater than or equal to 80%. Plugged channels for this configuration may be located at the inlet or outlet end, but are preferably located at the outlet end. Having a relatively higher percentage of plugs at the outlet end versus the outlet end coupled with high porosity, greater than 45% or even greater than or equal to 50%, may provide initial filtration efficiency (FE @ 0 g/L) wherein FE @ 0 g/L≥40%, FE @ 0 g/L≥50%, or even FE @ 0 g/L≥60%.

Figure 3B:
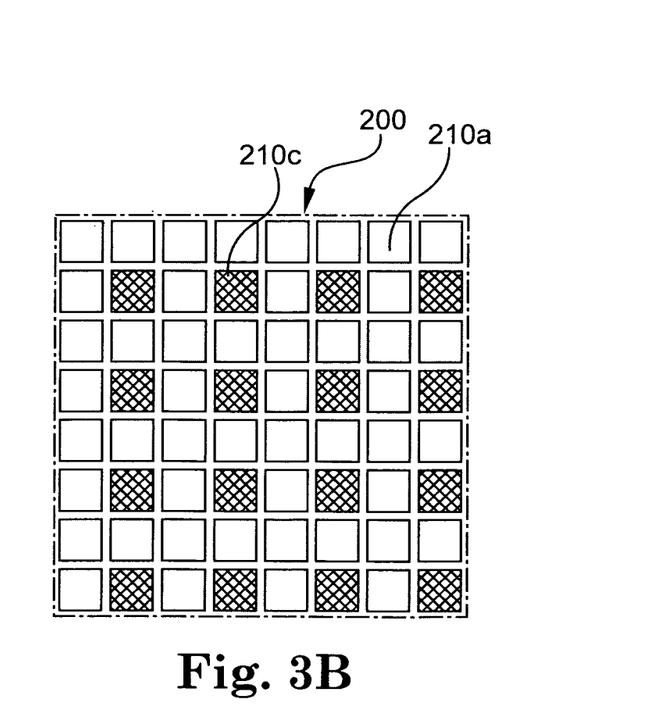

FIG. 3B shows an alternative plugging pattern for the filter 200 wherein the number of unplugged, flow-through channel 210a is greater than the number of plugged channels 210c. Again, the plugged channels may be evenly distributed among the unplugged, flow-through channels 210a. As an example, the number of unplugged, flow-through channels may constitute greater than 50% of the total number of channels, or even greater than 60%, or even 75% or more of the total number of channels.

Figure 3C:
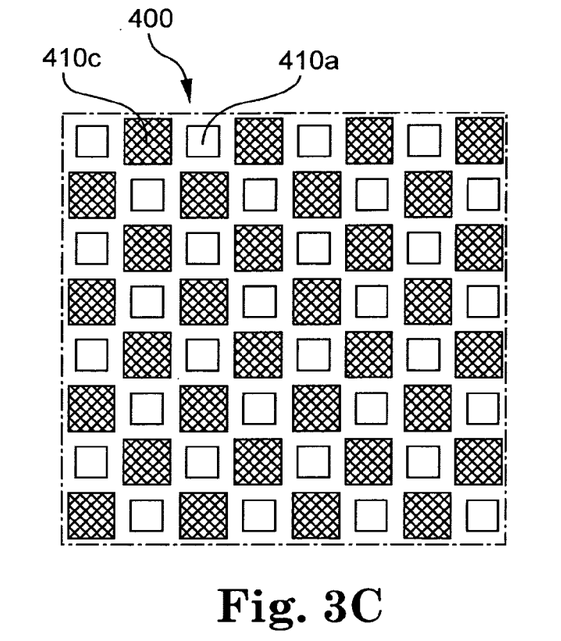

FIG. 3C shows a partial plugging pattern for a partial wall-flow filter 400 including unplugged, flow-through channels 410a and plugged channels 410c, wherein the hydraulic diameters of the plugged and unplugged, flow-through channels are different. In particular, the hydraulic diameter of the plugged channels 410c are larger than the hydraulic diameter of the unplugged, flow-through channels 410a. The plugged channels may be located adjacent to the inlet or outlet end. In particular, an area ratio of the plugged area to open area of the filter is preferably 1.1 or more, 1.2 or more, or even 1.3 or more.

Figure 3D:
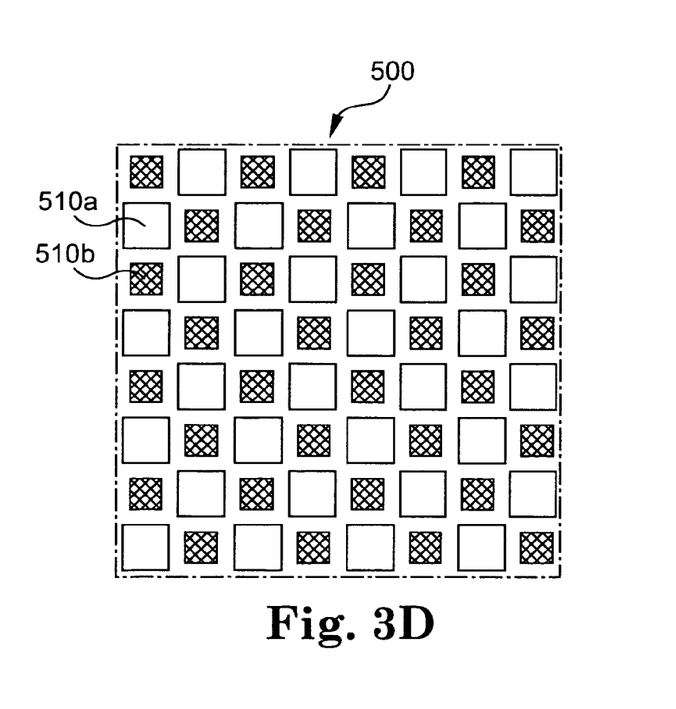

FIG. 3D illustrates another partial plugging pattern for a partial wall-flow filter 500 including unplugged, flow-through channels 510a and plugged channels 510c, wherein the hydraulic diameter of the unplugged, flow-through channels are larger than the hydraulic diameter of the plugged channels. In FIGS. 3C and 3D, the unplugged, flow-through channels are evenly distributed among the plugged channels. The plugs are preferably located only on the inlet end in the FIGS. 3C and 3D embodiments, such as shown in FIG. 3, except with the area ratio being greater than 1.1.

Figure 4A:
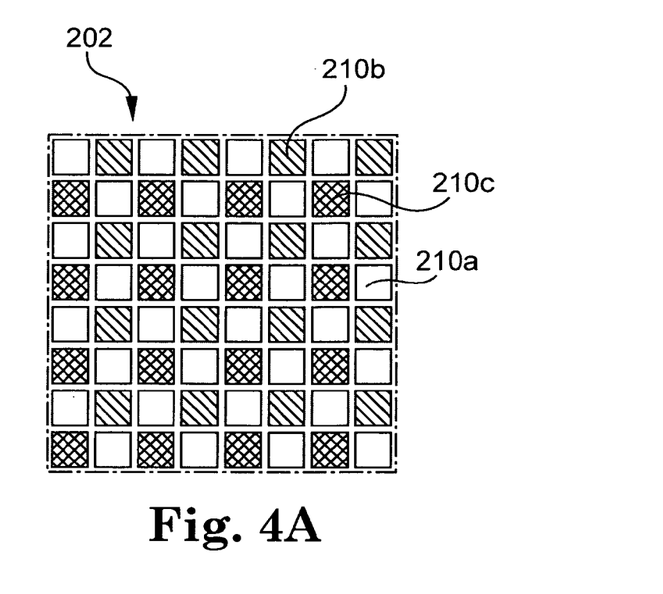
FIG. 4A shows a partial plugging pattern applied at both ends of the partial wall-flow filter of FIGS. 2A, 2B.
Figure 4B:
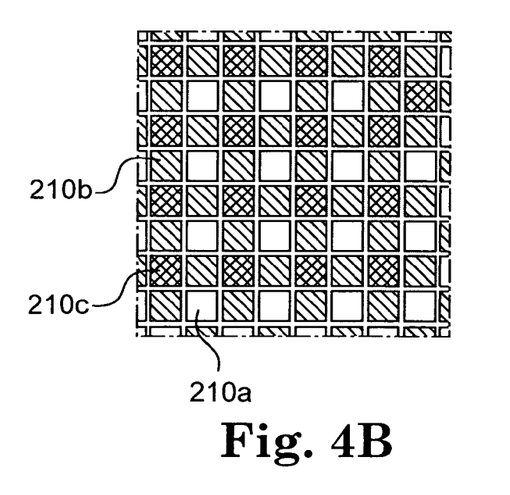
FIGS. 4B and 4C illustrate an alternative partial plugging pattern applied at both ends of the partial wall-flow filter.
Figure 4C:
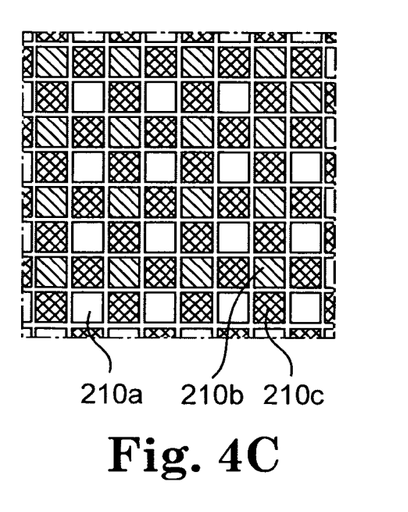

The partial plugging patterns described above and variations thereof can be applied to one or both end faces of the honeycomb substrate. Channels plugged adjacent to the inlet end are shown doubly hatched, whereas cells plugged adjacent the outlet end are shown singly hatched. Flow through channels are un-hatched. For example, FIG. 4A shows a partial top view of the honeycomb substrate 202 where the partial plugging pattern of FIG. 3B is applied to both end faces of the honeycomb substrate 202. The unplugged, flow-through channels are designated 210a. The plugged channels on one of the end faces of the honeycomb substrate 202 are designated 210b. The plugged channels on the other of the end faces of the honeycomb substrate 202 (shown double hatched) are designated 210c. In this example, the plugged channels 210b, 210c account for about 50% of the total channels in the honeycomb substrate 202 and the unplugged, flow-through channels 210a are evenly distributed within the honeycomb substrate 202. FIG. 4B and FIG. 4C illustrates other partial plugging configurations.

Some embodiments have a configuration with more plugged outlet channels (which are plugged at the inlet end) than inlet channels (plugged at the outlet end), where channels plugged adjacent to the end shown are doubly hatched, whereas cells plugged adjacent the other end are singly hatched, and flow-through channels are unhatched; in some of these embodiments, the channels plugged at the outlet end consist of about 25% of the total number of cell channels, whereas, at the inlet end, the plugged channels account for about 50% of the total number of channels such as illustrated. Thus 75% of the total number of cell channels are plugged.

Figure 5:
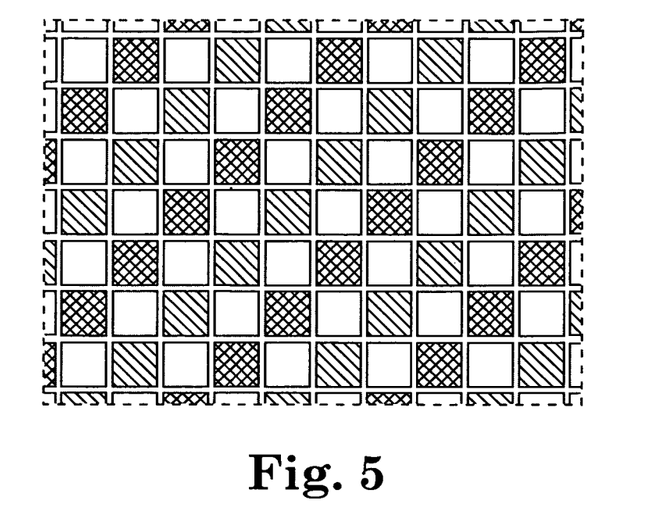
FIGS. 5 and 6 illustrate alternative partial plugging patterns applied at both end faces of the partial wall-flow filter according to exemplary embodiments.
Figure 6:
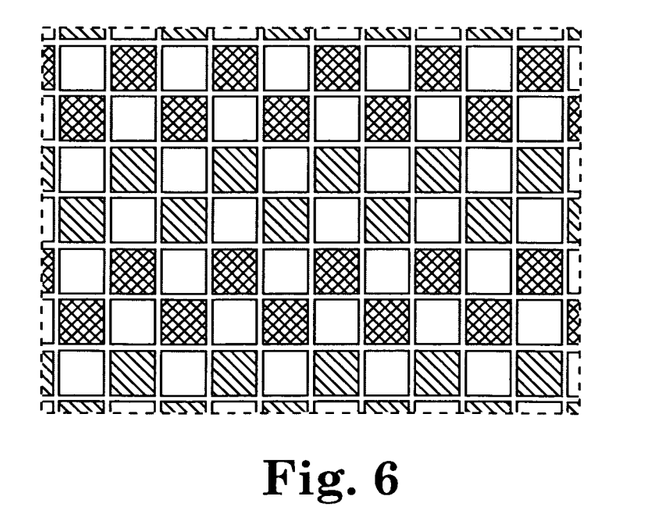

FIGS. 5 and 6 illustrate additional embodiments of plug patterns that may be employed in the partial wall-flow filter. In these embodiments, the inlet end plugged cells are shown single hatched, the outlet end plugged cells are shown double hatched, and the flow-through cells are shown un-hatched. In these examples, about 50% of the cell channels are plugged and some of the plugged channels are located adjacent, i.e., at or near, the inlet end and some are located adjacent the outlet end. Other combinations of plugged and unplugged cells in the partial wall-flow filter may be employed. For example, greater than 50%, or greater than 60%, or even 75% or greater of the channels may be plugged, as compared to the total number of channels. Various modeled embodiments are found in the following Tables.

TABLE 1

Modeling Results

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 1 | 50/37.5 | 275 | 203 | 60 | 15 | 87.5 | 9 | 5.66 | 1.59 | 69 | 67 | 4.8 | 9.6 |
| 2 | 50/25 | 275 | 203 | 60 | 15 | 75 | 9 | 5.66 | 1.59 | 57 | 50 | 4.1 | 7.6 |
| 3 | 50/0 | 275 | 203 | 60 | 15 | 50 | 9 | 5.66 | 1.59 | 47 | 34 | 3.4 | 5.6 |
| 4 | 50/37.5 | 275 | 203 | 60 | 15 | 87.5 | 6 | 5.66 | 1.06 | 67 | 53 | 4.1 | 8.9 |
| 5 | 50/25 | 275 | 203 | 60 | 15 | 75 | 6 | 5.66 | 1.06 | 54 | 36 | 3.6 | 6.8 |
| 6 | 50/0 | 275 | 203 | 60 | 15 | 50 | 6 | 5.66 | 1.06 | 42 | 22 | 3.1 | 5.0 |
| 7 | 37.5/50 | 275 | 203 | 60 | 15 | 87.5 | 9 | 5.66 | 1.59 | 69 | 43 | 4.8 | 7.2 |
| 8 | 25/50 | 275 | 203 | 60 | 15 | 75 | 9 | 5.66 | 1.59 | 57 | 29 | 4.1 | 5.5 |
| 9 | 0/50 | 275 | 203 | 60 | 15 | 50 | 9 | 5.66 | 1.59 | 47 | 19 | 3.4 | 4.3 |
| 10 | 37.5/50 | 275 | 203 | 60 | 15 | 87.5 | 6 | 5.66 | 1.59 | 66 | 30 | 4.2 | 6.3 |

TABLE 2

Modeling Results Cont.

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 11 | 25/50 | 275 | 203 | 60 | 15 | 75 | 6 | 5.66 | 1.06 | 54 | 19 | 3.6 | 4.8 |
| 12 | 0/50 | 275 | 203 | 60 | 15 | 50 | 6 | 5.66 | 1.06 | 43 | 11 | 3.1 | 3.9 |
| 13 | 50/37.5 | 275 | 203 | 60 | 15 | 87.5 | 9 | 7 | 1.29 | 69 | 67 | 2.9 | 6 |
| 14 | 50/25 | 275 | 203 | 60 | 15 | 75 | 9 | 7 | 1.29 | 57 | 50 | 2.5 | 4.7 |
| 15 | 50/0 | 275 | 203 | 60 | 15 | 50 | 9 | 7 | 1.29 | 46 | 34 | 2.1 | 3.4 |
| 16 | 50/37.5 | 275 | 203 | 60 | 15 | 87.5 | 6 | 7 | 0.86 | 67 | 53 | 2.5 | 5.6 |
| 17 | 50/25 | 275 | 203 | 60 | 15 | 75 | 6 | 7 | 0.86 | 54 | 36 | 2.2 | 4.2 |
| 18 | 50/0 | 275 | 203 | 60 | 15 | 50 | 6 | 7 | 0.86 | 43 | 22 | 1.9 | 3.0 |
| 19 | 50/37.5 | 275 | 203 | 60 | 15 | 87.5 | 9 | 8 | 1.13 | 69 | 67 | 2.0 | 4.4 |
| 20 | 50/25 | 275 | 203 | 60 | 15 | 75 | 9 | 8 | 1.13 | 57 | 50 | 1.6 | 3.3 |

TABLE 3

Modeling Results Cont.

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 21 | 50/0 | 275 | 203 | 60 | 15 | 50 | 9 | 8 | 1.13 | 46 | 34 | 1.3 | 2.3 |
| 22 | 50/37.5 | 275 | 203 | 60 | 15 | 87.5 | 6 | 8 | 0.75 | 67 | 53 | 1.7 | 4.1 |
| 23 | 50/25 | 275 | 203 | 60 | 15 | 75 | 6 | 8 | 0.75 | 54 | 36 | 1.4 | 2.9 |
| 24 | 50/0 | 275 | 203 | 60 | 15 | 50 | 6 | 8 | 0.75 | 43 | 22 | 1.2 | 2.0 |
| 25 | 50/37.5 | 275 | 254 | 60 | 15 | 87.5 | 9 | 5.66 | 1.59 | 69 | 70 | 5.8 | 7.6 |
| 26 | 50/25 | 275 | 254 | 60 | 15 | 75 | 9 | 5.66 | 1.59 | 57 | 53 | 4.9 | 9.3 |
| 27 | 50/0 | 275 | 254 | 60 | 15 | 50 | 9 | 5.66 | 1.59 | 46 | 36 | 4.2 | 6.9 |
| 28 | 50/37.5 | 275 | 254 | 60 | 15 | 87.5 | 6 | 5.66 | 1.59 | 67 | 56 | 5.0 | 11.0 |
| 29 | 50/25 | 275 | 254 | 60 | 15 | 75 | 6 | 5.66 | 1.06 | 53 | 39 | 4.4 | 8.3 |
| 30 | 50/0 | 275 | 254 | 60 | 15 | 50 | 6 | 5.66 | 1.06 | 42 | 24 | 3.8 | 6.2 |

TABLE 4

Modeling Results Cont.

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 31 | 50/37.5 | 275 | 305 | 60 | 15 | 87.5 | 9 | 5.66 | 1.59 | 69 | 73 | 6.9 | 14.0 |
| 32 | 50/25 | 275 | 305 | 60 | 15 | 75 | 9 | 5.66 | 1.59 | 57 | 56 | 6.0 | 11.5 |

TABLE 4-continued

Modeling Results Cont.

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 33 | 50/0 | 275 | 305 | 60 | 15 | 50 | 9 | 5.66 | 1.59 | 46 | 38 | 5.1 | 8.6 |
| 34 | 50/37.5 | 275 | 305 | 60 | 15 | 87.5 | 6 | 5.66 | 1.06 | 66 | 60 | 6.1 | 13.3 |
| 35 | 50/25 | 275 | 305 | 60 | 15 | 75 | 6 | 5.66 | 1.06 | 53 | 42 | 5.3 | 10.3 |
| 36 | 50/0 | 275 | 305 | 60 | 15 | 50 | 6 | 5.66 | 1.06 | 42 | 27 | 4.7 | 7.7 |
| 37 | 50/37.5 | 275 | 203 | 50 | 15 | 87.5 | 9 | 5.66 | 1.59 | 69 | 67 | 4.8 | 9.6 |
| 38 | 50/25 | 275 | 203 | 50 | 15 | 75 | 9 | 5.66 | 1.59 | 57 | 50 | 4.1 | 7.6 |
| 39 | 50/0 | 275 | 203 | 50 | 15 | 50 | 9 | 5.66 | 1.59 | 46 | 34 | 3.4 | 5.6 |
| 40 | 50/37.5 | 275 | 203 | 50 | 15 | 87.5 | 6 | 5.66 | 1.06 | 66 | 53 | 4.2 | 9.0 |

TABLE 5

Modeling Results Cont.

| Ex. No. | % Plug Inlet/ % Plug Outlet | CD (cpsi) | t wall (μm) | % P | MPD (μm) | % Plug | L (in) | D (in) | L/D | FE 0 g/L (%) | FE 5 g/L (%) | ΔP 0 g/L (kPa) | ΔP 5 g/L (kPa) |
|---|---|---|---|---|---|---|---|---|---|---|---|---|---|
| 41 | 50/25 | 275 | 203 | 50 | 15 | 75 | 6 | 5.66 | 1.06 | 53 | 36 | 3.6 | 6.8 |
| 42 | 50/0 | 275 | 203 | 50 | 15 | 50 | 6 | 5.66 | 1.06 | 42 | 22 | 3.1 | 5.0 |
| 43 | 50/37.5 | 275 | 203 | 60 | 10 | 87.5 | 9 | 5.66 | 1.59 | 67 | 66 | 5.0 | 9.7 |
| 44 | 50/25 | 275 | 203 | 60 | 10 | 75 | 9 | 5.66 | 1.59 | 54 | 49 | 4.2 | 7.7 |
| 45 | 50/0 | 275 | 203 | 60 | 10 | 50 | 9 | 5.66 | 1.59 | 43 | 33 | 3.5 | 5.7 |
| 46 | 50/37.5 | 275 | 203 | 60 | 10 | 87.5 | 6 | 5.66 | 1.06 | 62 | 52 | 4.4 | 9.2 |
| 47 | 50/25 | 275 | 203 | 60 | 10 | 75 | 6 | 5.66 | 1.06 | 48 | 35 | 3.7 | 6.9 |
| 48 | 50/0 | 275 | 203 | 60 | 10 | 50 | 6 | 5.66 | 1.06 | 36 | 21 | 3.2 | 5.0 |
| 49 | 50/37.5 | 275 | 203 | 60 | 20 | 87.5 | 9 | 5.66 | 1.59 | 70 | 67.6 | 4.8 | 9.6 |
| 50 | 50/25 | 275 | 203 | 60 | 20 | 75 | 9 | 5.66 | 1.59 | 58 | 51 | 4.0 | 7.6 |
| 51 | 50/37.5 | 275 | 203 | 60 | 15 | | 9 | 5.66 | | 55 | 54 | 6 | 8.6 |
| 52 | 50/25 | 275 | 203 | 60 | 15 | | 9 | 5.66 | | 42 | 37 | 5.3 | 6.8 |
| 53 | 50/0 | 275 | 203 | 60 | 15 | | 9 | 5.66 | | 32 | 24 | 4.7 | 5.4 |
| 54 | 50/37.5 | 275 | 203 | 60 | 15 | | 6 | 5.66 | | 53 | 40 | 5.4 | 7.7 |
| 55 | 50/25 | 275 | 203 | 60 | 15 | | 6 | 5.66 | | 39 | 26 | 4.8 | 6.1 |
| 56 | 50/0 | 275 | 203 | 60 | 15 | | 6 | 5.66 | | 29 | 16 | 4.4 | 5 |

Examples 51-56 had a ratio of inlet hydraulic diameter to outlet hydraulic diameter of 1.3.

As seen in the above Tables, we have found that having the missing plugs on the back side results in higher filtration efficiency, although with slightly higher pressure drop (particularly for soot loaded filter). Back side missing plugs are thus preferred compared to plugs missing on the front side. While the fraction of missing plugs depends on the pressure drop specifications, the filtration efficiency (FE) is relatively high for percentage of plugged channels greater than 25%. Below 25% plugged channels, the FE continues to decrease with soot loading and can be quite low for high soot load levels. FE increases significantly with CPSI, with modest increase in pressure drop, particularly for soot loaded filter; CPSI greater than 250 is preferred, more preferably greater than 300 and most preferably greater than 350. Increase in wall thickness increases pressure drop significantly, with modest increase in filtration efficiency; wall thicknesses less than 12 mils are preferred, more preferable less than 10 mils and most preferably less than 8 mils. Increasing the length of the filter increases the FE significantly, while the corresponding increase in pressure drop is modest. Increasing diameter does not significantly impact FE while significantly lowering the pressure drop; filters with space velocity less than 100 sec is preferred, more preferably less than 70 sec$^{-1}$ and most preferably less than 35 sec$^{-1}$. MPS less than 20 μm is preferred with more preferably range greater than 20 um. FE and pressure drop both improve with higher porosity; preferably porosity is greater than 50% and more preferably greater than 60%.

Figure 7:
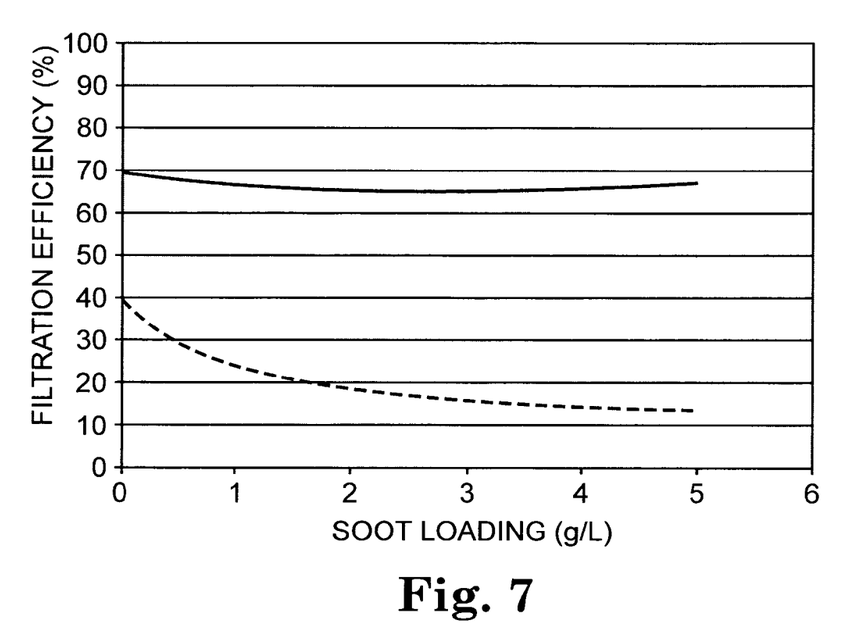
FIG. 7 illustrate a performance plots for various configurations of the partial wall-flow filter according to exemplary embodiments.

FIG. 7 illustrates two sets of embodiments of the partial wall-flow filter. Both embodiments have a filter diameter of 5.66 inches, wall thickness of 8 mils, wall porosity of 60%, and wall mean pore size (MPS) of 15 microns. The filters were each tested with an exhaust gas mass flow rate of 375 kg/hr at a temperature of 590° C. The first filter (solid line) has a plugging pattern in which 50% of the inlet channels and 37.5% of the outlet channels are plugged (i.e., 50/37.5), a length of 9 inches, and a cell density of 275 cells per square inch (CPSI). As can be seen in FIG. 7, the first filter (solid line) exhibits a substantially constant filtration efficiency (e.g. between 60 and 70%) over a wide range of filter soot loading (0 to 5 g/L). The second filter (dashed line) has a plugging pattern in which 50% of the inlet channels and none of the outlet channels are plugged (i.e., 50/0), a length of 6 inches, and a cell density of 200 cells per square inch (CPSI). As can be seen in FIG. 7, the second filter (dashed line) exhibits a filtration efficiency that decreases with increasing filter soot loading (40 to 15% FE for 0 to 5 g/L soot loading.). The second filter can be advantageous for applications where the filter essentially self-regulates or auto-regulates, e.g. pressure drop, i.e. if the filter becomes too much loaded with soot, the soot tends to travel past or through the filter; thus these filters can be used as a self bypass system especially for retrofit applications.

While the disclosure describes a limited number of embodiments, those skilled in the art, having benefit of this disclosure, will appreciate that other embodiments can be devised which do not depart from the scope of the invention as claimed herein. Accordingly, the scope of the invention should be limited only by the attached claims.

What is claimed is:

1. A partial wall-flow filter, comprising:
a plurality of porous walls forming channels wherein some of the channels are plugged channels and some are unplugged flow-through channels, wherein the plugged channels include some channels at or near the center of the filter that are plugged adjacent to an inlet end of the filter and other channels at or near the center of the filter that are plugged adjacent to an outlet end of the filter, a number of channels plugged adjacent to the inlet end is less than a number of channels that are plugged adjacent to the outlet end, and the porous walls further comprise:
t wall≤305 μm,
MPD≤20 μm,
% P≥50%, and
CD≥250 cpsi
wherein t wall is the transverse thickness of the porous walls, MPD is a mean pore diameter of the porous walls, % P is the total porosity of the porous walls, and CD is the cell density of the channels.

2. The partial wall-flow filter of claim 1, further comprising a percentage of plugged channels to total channels greater than 50% and less than 100%.

3. The partial wall-flow filter of claim 1, further comprising percentage of plugged channels to total channels is greater than 70% and less than 100%.

4. The partial wall-flow filter of claim 1, further comprising percentage of plugged channels to total channels is greater than 80% and less than 100%.

5. The partial wall-flow filter of claim 1, wherein CD≥300 cpsi.

6. The partial wall-flow filter of claim 1, wherein CD≥350 cpsi.

7. The partial wall-flow filter of claim 1, wherein t wall≤254 μm.

8. The partial wall-flow filter of claim 1, wherein t wall≤203 μm.

9. The partial wall-flow filter of claim 1, wherein MPD≤15 μm.

10. The partial wall-flow filter of claim 1, wherein 12 μm≤MPD≤20 μm.

11. The partial wall-flow filter of claim 1, wherein a L/D ratio≤1.25, wherein the L/D ratio is the length of the partial wall-low filter divided by the diameter of the partial wall-low filter.

12. The partial wall-flow filter of claim 1, further comprising % P≥60%.

13. The partial wall-flow filter of claim 1, further comprising a cross sectional area of each of the plugged channels is greater than a cross sectional area of each of the unplugged channels.

14. The partial wall-flow filter of claim 1, wherein 40%≥FE≥70%, wherein FE is filtration efficiency.

15. A partial wall-flow filter, comprising:
a plurality of porous walls forming channels, wherein the plugged channels include some channels at or near the center of the filter that are plugged adjacent to an inlet end of the filter and other channels at or near the center of the filter that are plugged adjacent to an outlet end of the filter, a number of channels plugged adjacent to the inlet end is less than a number of channels that are plugged adjacent to the outlet end, wherein some of the channels are plugged channels and some are unplugged flow-through channels and the porous walls further comprise:
t wall≤254 μm,
12 μm≤MPD≤20 μm,
% P≥55%, and
CD≥300 cpsi
wherein t wall is the transverse thickness of the porous walls, MPD is a mean pore diameter of the porous walls, % P is the total porosity of the porous walls, and CD is the cell density of the channels.

16. A method of operating an exhaust system, comprising:
providing a partial wall flow filter having a plurality of porous walls forming channels wherein some of the channels are plugged channels and some are unplugged flow-through channels in an exhaust line, wherein the plugged channels include some channels at or near the center of the filter that are plugged adjacent to an inlet end of the filter and other channels at or near the center of the filter that are plugged adjacent to an outlet end of the filter, a number of channels plugged adjacent to the inlet end is less than a number of channels that are plugged adjacent to the outlet end, wherein the porous walls further comprise:
t wall≤305 μm,
MPD≤20 μm,
% P≥50%, and
CD≥250 cpsi
wherein t wall is the transverse thickness of the porous walls, MPD is a mean pore diameter of the porous walls, % P is the total porosity of the porous walls, and CD is the cell density of the channels, and
passing exhaust gas having particulate matter entrained therein through the partial wall-flow filter wherein some of the particulate matter is captured and some passes through the flow through channels.

17. A partial wall-flow filter, comprising:
a plurality of porous walls forming channels wherein some of the channels are plugged channels and some are unplugged flow-through channels, wherein the plugged channels include some channels at or near the center of the filter that are plugged adjacent to an inlet end of the filter and other channels at or near the center of the filter that are plugged adjacent to an outlet end of the filter, a number of channels plugged adjacent to the outlet end is less than a number of channels that are plugged adjacent to the inlet end, and the porous walls further comprise:
t wall≤305 μm,
MPD≤20 μm,
% P≥50%, and
CD≥250 cpsi
wherein t wall is the transverse thickness of the porous walls, MPD is a mean pore diameter of the porous walls, % P is the total porosity of the porous walls, and CD is the cell density of the channels.

* * * * *